Oct. 14, 1941.   V. F. GREAVES   2,258,984
PROGRESSIVE SEPARATOR
Filed May 13, 1940
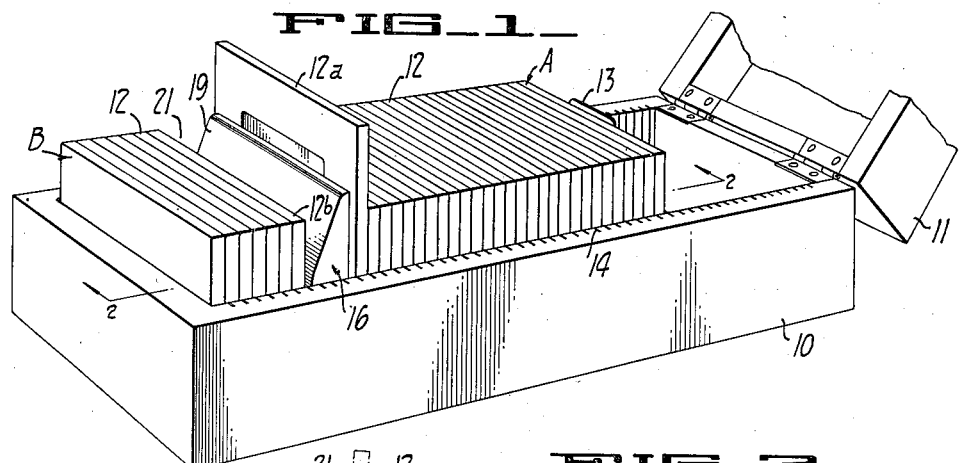
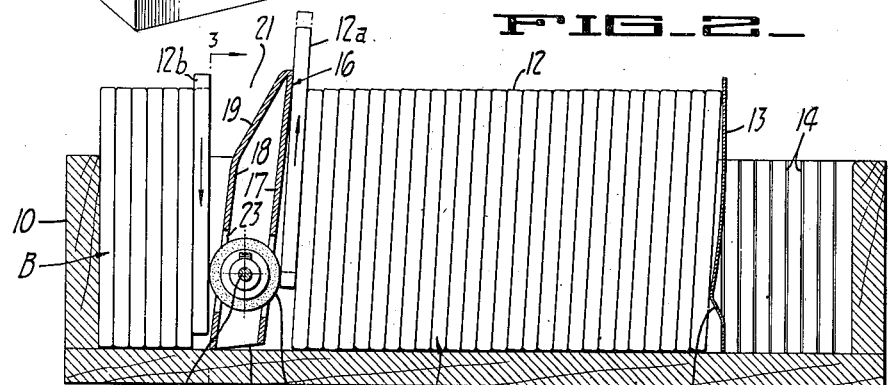
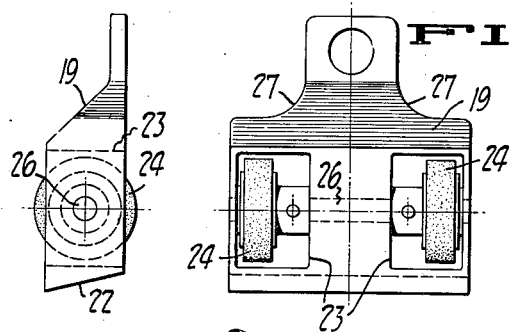
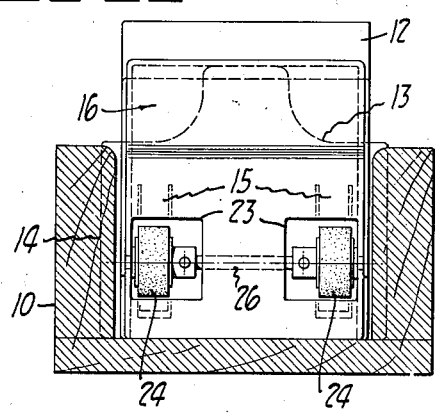
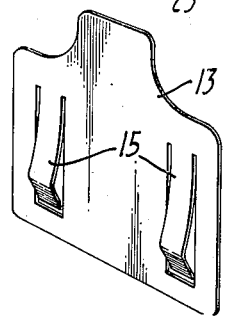
INVENTOR
Valentine F. Greaves
BY Paul D. Flehr
ATTORNEY Patented Oct. 14, 1941

2,258,984

UNITED STATES PATENT OFFICE 2,258,984

PROGRESSIVE SEPARATOR

Valentine F. Greaves, Oakland, Calif.

Application May 13, 1940, Serial No. 334,860

9 Claims. (Cl. 312—92)

This invention relates to equipment for use in the storage and handling of material such as projection slides when arranged in a desired sequence, and is concerned more particularly with the provision of an improved progressive separator whereby the individual slides of a series of sequentially arranged slides can be progressively selected and elevated for removal in the projection operation and returned after use to their proper place in the original sequence.

It is an object of the invention to provide an improved progressive separator in which the next slide to be projected is automatically elevated in response to return of the slide last projected.

Other objects and advantages of the invention will be apparent from the following description of certain preferred embodiments thereof as illustrated in the accompanying drawing, in which:

Fig. 1 is a perspective view illustrating a progressive separator in place in a series of pre-arranged slides in their container.

Fig. 2 is a longitudinal sectional view partially in elevation of the device shown in Fig. 1, the view being taken as indicated by the line 2—2 in Fig. 1.

Fig. 3 is a transverse sectional elevation of the progressive separator as installed in the box, the view being indicated by the line 3—3 in Fig. 2.

Fig. 4 is an elevational view of a modified form of progressive separator.

Fig. 5 is a side elevational view of the separator shown in Fig. 4.

Fig. 6 is a perspective view of a partition member for use in the slide box to enable the use of the box for different numbers of slides.

Referring to Figs. 1 and 2, a container or box 10 is provided having a hinged lid 11. The box 10 is adapted to contain a series of projection slides 12 which fit loosely within the box and project above its side walls. Any desired number of projection slides 12 may be installed in the box, which can have its storage capacity effectively shortened by means of a partition member 13 comprising a metal plate having its side edges adapted for insertion in vertically disposed grooves 14 formed in the side walls of the box. The partition member 13 may be provided, if desired, with a pair of struck-out spring ears 15 for engagement with the adjacent slide of the series.

The progressive separator shown herein is of the type adapted to step or progress along the box to separate a series of pre-arranged slides into a group of slides to be projected and a group of slides which have been projected, the number of slides in the groups varying as the slides are projected in sequence and the separator is progressed along the box. The separator is of a type adapted to form a guide opening for ready return of used slides to the projected group and for automatically elevating the next slide to be projected upon return of a projected slide to the corresponding group.

As seen in Figs. 1, 2 and 3, the separator 16 is provided with opposite side walls 17 and 18 which are disposed adjacent the group of slides to be projected and the group of projected slides respectively. The side wall 18 is of less height than the side wall 17 and merges at its upper end with an inclined wall 19 which diverges from the adjacent slide 12 to provide an opening 21 for return of slides after use. The lower ends of the respective walls 17 and 18 are preferably of different heights from the bottom of the box to provide an inclined bottom surface 22 with its lowermost edge adjacent the projected slides.

To provide for automatic elevation of the next slide to be projected upon return of a projected slide, the respective side walls 17 and 18 are provided with a pair of spaced-apart aligned openings 23 through which respective rollers 24 project. The rollers 24 may be secured in any convenient manner upon a transverse shaft 26 which is suitably journalled in the walls of the separator. The rollers 24 may be formed with friction surfaces of any suitable material, for example, rubber.

As seen in Fig. 2, the rollers 24 project beyond the respective side walls 17 and 18 to engage the adjacent slides 12 of the group of slides to be projected A and the projected group of slides B. Upon return of a slide into the group B, for example as indicated at 12b, the rollers 24 are rotated to in turn effect elevation of the adjacent slide 12a of the group A. As shown in full lines in Fig. 2, the slide 12b is not fully seated and the slide 12a is not fully elevated, the fully elevated position of the slide 12a being indicated in dotted lines. In such elevated position, the slide can be easily picked up by the operator for use in the projection machine.

The above described sequence of operation continues as the slides are successively removed from group A, used, and returned to group B, the separator 16 progressing along the box as the slides are successively removed from the group A and returned to the group B, with the next adjacent slide of the group A being elevated each time by the rollers 24 upon return of a slide to group B.

In the form of the invention shown in Figs. 4 and 5, the construction is generally similar to that described above, and differs principally in the provision of cut-away portions 27 at either side of the upper portion of the separator whereby the corners of the slides in group A are exposed for grasping by the operator to facilitate their removal.

I claim:

1. A progressive separator for use in a container having a series of pre-arranged projection slides disposed therein in row formation, said progressive separator being adapted to separate the series of slides into a group which are to be projected and a second group which have been projected, said separator being formed at its upper portion to define a guide opening leading to said projected group, said separator carrying means operable to elevate the next slide of the to-be-projected group, said separator also being movable along said container as the slides are successively removed and replaced.

2. A progressive separator for use in a container having a series of pre-arranged projection slides disposed therein in row formation, said progressive separator being adapted for insertion in said container to separate the series of slides into a group which are to be projected and a second group which have been projected, said separator having one side surface formed at its upper portion to lie flush against the next slide to be projected and having its other surface diverging from the adjacent slide of the projected group, said separator carrying means operable in response to insertion of a slide adjacent said diverging surface to elevate the next slide of the to-be-projected group.

3. A progressive separator for use with a series of projection slides having a pre-arranged sequence and a container for said series of slides, said separator being adapted for disposition in said container to separate the series of slides into a group which are to be projected and another group which have been projected, said separator having one side surface formed adjacent its upper end to lie flush against the next slide to be projected and having its other surface diverging adjacent its upper portion from the adjacent slide of the projected group to define a guide opening leading to said projected group, and roller means carried by said separator and projecting beyond the respective side surfaces thereof, whereby to elevate the next adjacent slide of the group to be projected upon return of a slide to the projected group.

4. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening leading to said projected group, and roller means carried by said separator and projecting beyond the respective side surfaces thereof, whereby to elevate the next adjacent slide of the group to be projected upon return of a slide to the projected group.

5. A progressive separator for use with a series of projection slides having a pre-arranged sequence and a container for said series of slides, said separator being adapted for disposition in said container to separate the series of slides into a group which are to be projected and another group which have been projected, said separator having one side surface formed at its upper end to lie flush against the next slide to be projected and having its other surface diverging adjacent its upper portion from the adjacent slide of the projected group to define a guide opening leading to said projected group, and spaced-apart rollers carried by said separator and projecting beyond the side surfaces thereof, whereby to elevate the next adjacent slide of the group to be projected upon return of a slide to the projected group, the spacing between said rollers being greater than the similar light-transmitting dimension of the slides.

6. A progressive separator for use with a series of projection slides having a pre-arranged sequence and a container for said series of slides, said separator being adapted for disposition in said container to separate the series of slides into a group which are to be projected and another group which have been projected, said separator having one side surface formed at its upper end to lie flush against the next slide to be projected and having its other surface diverging adjacent its upper portion from the adjacent slide of the projected group to define a guide opening leading to said projected group, and roller means carried by said separator and projecting beyond the side surfaces thereof, whereby to elevate the next adjacent slide of the group to be projected upon return of a slide to the projected group, said bottom surface of said separator being formed to cause tilting of the separator toward the group of to-be-projected slides.

7. A progressive separator for use with a series of projection slides having a pre-arranged sequence and a container for said series of slides, said separator being adapted for disposition in said container to separate the series of slides into a group which are to be projected and another group which have been projected, and roller means carried by said separator and projecting beyond the respective side surfaces thereof, whereby to elevate the next adjacent slide of the group to be projected upon return of a slide to the projected group.

8. In combination, a box for containing a series of slides in row formation, a separator adapted for insertion in said series of slides to separate the series into a group which are to be projected and another group which have been projected, said separator including a resilient slide engaging means, a member for insertion in said box at one end of said series of slides, said member having resilient means associated therewith for exerting pressure on said series of slides for holding them in contact with said separator resilient slide engaging means.

9. A progressive separator for use with a series of projection slides having a pre-arranged sequence and a container for said series of slides, said separator being adapted for disposition in said container to separate the series of slides into one group which are to be projected and another group which have been projected, said separator having means projecting toward a group of to be projected slides and adapted for movement into engagement with the next adjacent slide of said one group, to lift said slide into accessible position for easy removal for projection.

VALENTINE F. GREAVES.